(12) United States Patent
Jeandot et al.

(10) Patent No.: US 8,734,043 B2
(45) Date of Patent: May 27, 2014

(54) WEBBED THROUGH PIVOT

(75) Inventors: Xavier Jeandot, Mandelieu (FR); Yannick Baudasse, Grasse (FR)

(73) Assignee: Thales, Neuilly-sur-Seine (FR)

( * ) Notice: Subject to any disclaimer, the term of this patent is extended or adjusted under 35 U.S.C. 154(b) by 566 days.

(21) Appl. No.: 12/038,069

(22) Filed: Feb. 27, 2008

(65) Prior Publication Data

US 2008/0205976 A1    Aug. 28, 2008

(30) Foreign Application Priority Data

Feb. 27, 2007   (FR) ...................................... 07 53521

(51) Int. Cl.
    *F16C 11/12*       (2006.01)
(52) U.S. Cl.
    USPC .......................................................... 403/111
(58) Field of Classification Search
    USPC ................. 403/111, 119, 120, 161–163, 203, 403/220–228, 291; 248/240, 291.1, 292.2, 248/554–557, 666, 635; 384/192, 202, 215, 384/295, 438, 441–444; 310/90; 60/796, 60/797; 343/757, 763, 766, 882; 267/141, 267/141.1, 141.2, 154, 160, 293; 415/119
    See application file for complete search history.

(56) References Cited

U.S. PATENT DOCUMENTS

| | | | | |
|---|---|---|---|---|
| 2,465,425 A | * | 3/1949 | Bower | 415/142 |
| 2,621,850 A | * | 12/1952 | Firth | 415/142 |
| 2,722,464 A | * | 11/1955 | Galaba | 384/202 |
| 2,936,999 A | * | 5/1960 | Jacobus et al. | 415/134 |
| 3,083,757 A | * | 4/1963 | Kraft et al. | 156/515 |
| 3,185,532 A | * | 5/1965 | Loch | 384/215 |
| 3,318,642 A | * | 5/1967 | Peterson | 384/215 |
| 3,343,013 A | * | 9/1967 | Wightman et al. | 310/216.132 |
| 3,400,939 A | * | 9/1968 | Jones | 277/357 |
| 3,468,587 A | * | 9/1969 | Hillander | 384/441 |
| 3,509,578 A | * | 4/1970 | Cribb | 343/873 |
| 3,648,999 A | * | 3/1972 | Bauer | 267/160 |
| 3,664,185 A | | 5/1972 | Low et al. | |
| 4,261,211 A | * | 4/1981 | Haberland | 74/5 F |
| 4,564,300 A | * | 1/1986 | Schulze | 384/581 |
| 4,655,614 A | * | 4/1987 | Schott | 384/220 |
| 5,209,461 A | * | 5/1993 | Whightsil, Sr. | 267/155 |
| 5,475,275 A | * | 12/1995 | Dohogne et al. | 310/89 |
| 5,545,118 A | * | 8/1996 | Romanauskas | 494/20 |
| 5,547,174 A | * | 8/1996 | Bade et al. | 267/154 |

(Continued)

FOREIGN PATENT DOCUMENTS

| | | |
|---|---|---|
| EP | 0449001 | 10/1991 |
| FR | 2212584 | 7/1974 |

OTHER PUBLICATIONS

English Abstract of GB1446729 which corresponds to FR2212584.

*Primary Examiner* — Joshua Kennedy

(74) *Attorney, Agent, or Firm* — Lowe, Hauptman & Ham, LLP

(57) ABSTRACT

Through pivot (1) has a stator (2) and a rotor (3). The rotor is capable of turning relative to the stator about an axis of rotation (A) and is capable of accepting a through shaft aligned with the axis of rotation. The rotor is connected to the stator by a plurality of webs (4) capable of being deformed to allow the rotor to rotate, and in that in a condition of rest the webs form an angle of inclination relative to a radial direction passing through the axis of rotation.

20 Claims, 2 Drawing Sheets

(56) References Cited

U.S. PATENT DOCUMENTS

| | | | |
|---|---|---|---|
| 5,610,461 A * | 3/1997 | Dohogne et al. | 310/89 |
| 5,620,169 A * | 4/1997 | Payne | 267/160 |
| 5,884,892 A * | 3/1999 | Gassen et al. | 248/635 |
| 6,146,044 A | 11/2000 | Calvet | |
| 6,200,220 B1 * | 3/2001 | Drew | 464/30 |
| 6,267,363 B1 * | 7/2001 | Genequand et al. | 267/161 |
| 6,440,044 B1 * | 8/2002 | Francis et al. | 482/114 |
| 6,508,630 B2 * | 1/2003 | Liu et al. | 416/228 |
| 6,911,757 B2 * | 6/2005 | Lopatinsky et al. | 310/164 |
| 7,093,827 B2 * | 8/2006 | Culpepper | 267/160 |
| 7,188,831 B2 * | 3/2007 | Coppoolse | 267/160 |
| 7,270,319 B2 * | 9/2007 | Culpepper | 267/160 |
| 7,364,145 B2 * | 4/2008 | Knirck et al. | 267/160 |
| 7,673,461 B2 * | 3/2010 | Cameriano et al. | 60/797 |
| 7,780,404 B2 * | 8/2010 | Horng et al. | 415/191 |
| 2003/0030348 A1 * | 2/2003 | Lopatinsky et al. | 310/254 |
| 2004/0094882 A1 * | 5/2004 | Coppoolse | 267/160 |
| 2004/0197189 A1 * | 10/2004 | Seo et al. | 415/121.2 |
| 2005/0053492 A1 * | 3/2005 | Su | 417/423.3 |
| 2005/0111906 A1 * | 5/2005 | Liou et al. | 403/120 |
| 2007/0065321 A1 * | 3/2007 | Durham | 417/559 |
| 2007/0129153 A1 * | 6/2007 | Grebenstein | 464/98 |
| 2008/0170935 A1 * | 7/2008 | Nakamura et al. | 415/119 |
| 2008/0193275 A1 * | 8/2008 | De Filippis et al. | 415/10 |
| 2010/0145510 A1 * | 6/2010 | Ihrke et al. | 700/245 |
| 2010/0296862 A1 * | 11/2010 | Baudasse | 403/291 |

\* cited by examiner

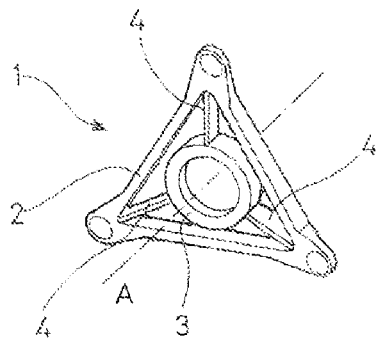
FIG_1
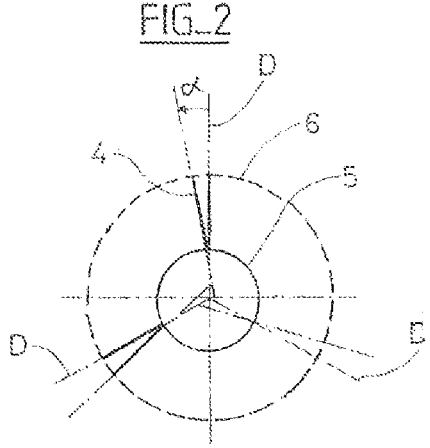
FIG_2
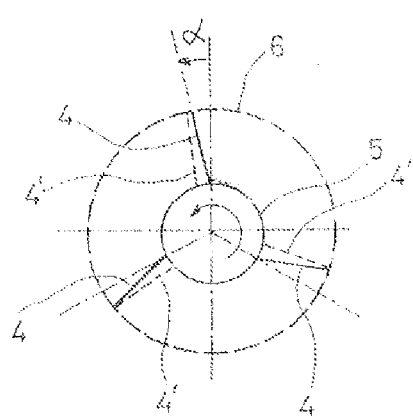
FIG_4
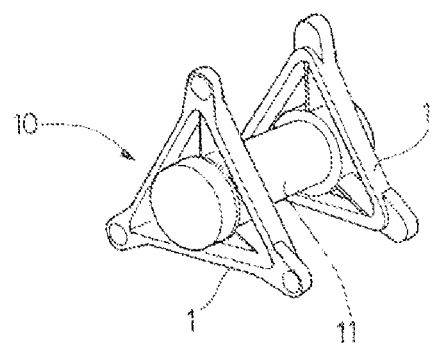
FIG_5
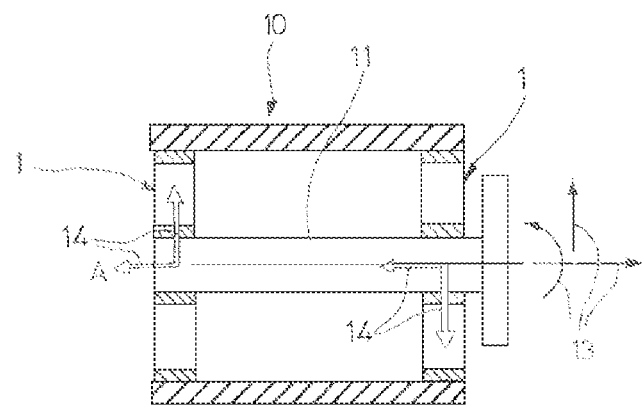
FIG_6

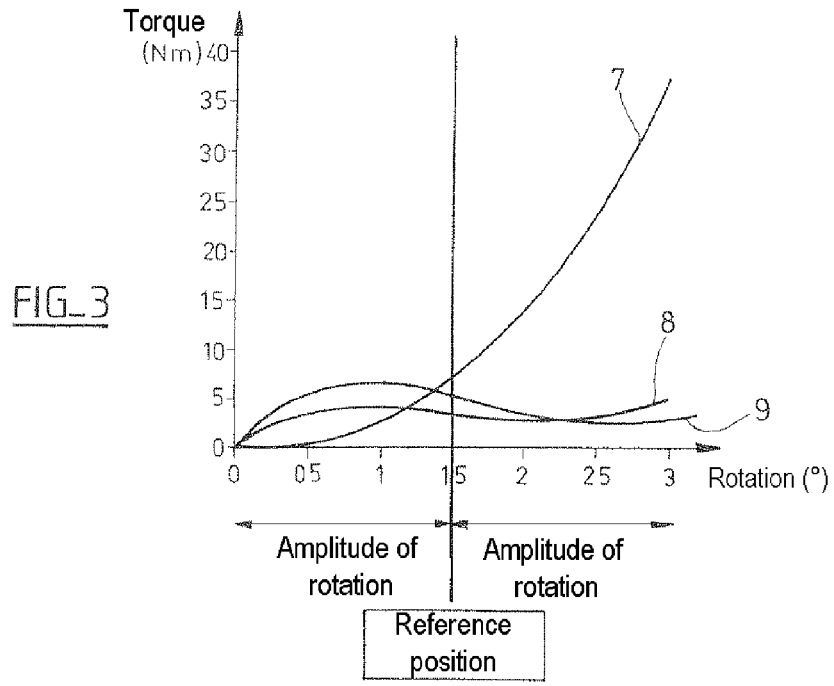
FIG_3
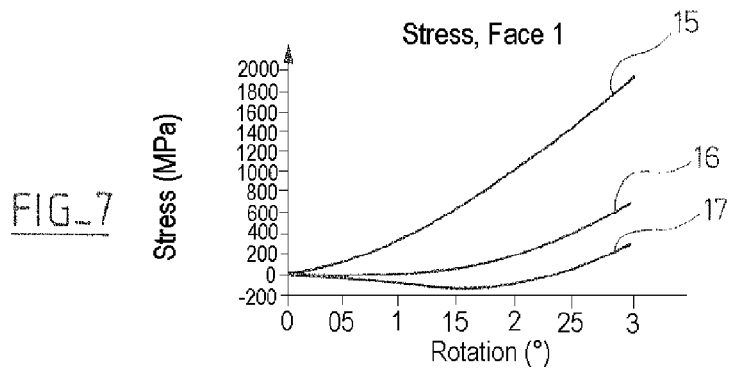
FIG_7
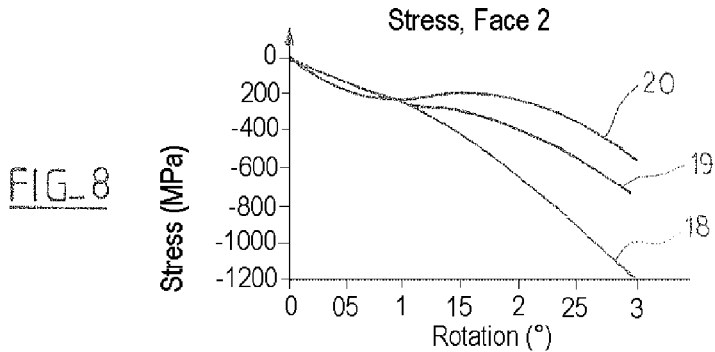
FIG_8

WEBBED THROUGH PIVOT

RELATED APPLICATIONS

The present application is based on, and claims priority from, French Application Number 07 53521, filed Feb. 27, 2007, the disclosure of which is hereby incorporated by reference herein in its entirety.

FILED OF THE INVENTION

The present invention relates to a through pivot, meaning a device capable of supporting a rotary shaft extending from both sides of the pivot, and to a mounting, made with this pivot, for a rotary shaft having a limited amplitude of rotation.

BACKGROUND OF THE INVENTION

In space applications it is necessary to be able to orientate certain components of a satellite or spacecraft, such as an antenna, a boom, etc., in a predetermined direction in order, for example, to point them at a fixed star, to maintain the aim at a point on the surface of the Earth, or to scan a particular region on the surface of the Earth or of some celestial body. These positionings require frequent corrections to compensate for the inevitable drift of direction, and these multiple corrections involve a large number of cycles of micro-rotation for these vehicular appendages and for their mountings. This phase is known as fine pointing.

Because of the irreversible nature of the insertion into orbit of a satellite, the design of the spacecraft has to build in a very long life, measured in number of cycles, for the mountings, in order to ensure their ability to withstand this enormous number of stresses. For example, the life may be greater than 600,000 cycles. Other requirements of the mountings are great mechanical strength (to withstand external forces and bending moments exerted on the mounted shaft), high transverse stiffness, high-precision zero-tolerance guidance, an amplitude of rotation greater than 1° in both directions, and, a low resistive torque.

It is known practice to construct a mounting for a rotary shaft with a pivot having crossed flexible webs, notably those known by the name "Bendix Pivot". This type of pivot is not a through pivot. It is therefore necessary to cantilever-mount the mounted shaft, which means large stresses in the webs of the pivot and large stresses being transmitted to the supporting frame, even with a double-pivot mounting. This type of pivot therefore offers limited mechanical strength and transverse stiffness, and does not satisfactorily meet all the requirements of a fine-pointing device.

It is also known practice to support a shaft with a mounting comprising two ball-bearing pivots. Such a device is subject to wear and therefore has a limited life. It also therefore does not satisfactorily meet all the requirements for a fine-pointing mounting design for a space application.

SUMMARY OF THE INVENTION

It is an object of the invention to provide a pivot and a mounting for a rotary shaft that avoids at least some of the above-mentioned drawbacks of the prior art. In particular, it is an object of the invention to provide a pivot and a mounting for a rotary shaft that are suitable for constructing a fine-pointing device, especially for a space application.

For this purpose, the invention provides a through pivot comprising a stator and a rotor, the rotor being capable of turning relative to the stator about an axis of rotation and being capable of accepting a through shaft aligned with the axis of rotation, which pivot is characterized in that the rotor is connected to the stator by a plurality of flexible elements capable of being deformed to allow the rotor to rotate, and in that in a condition of rest the flexible elements form an angle of inclination relative to a radial direction passing through the axis of rotation.

Because of these features, the pivot is able to support a through shaft, thus giving good mechanical behaviour. Moreover, because the rotor is allowed to rotate by the deformation of the flexible elements, there is no mechanical wear due to friction and its life is extended. It has been observed that arranging the flexible elements at an angle of inclination limits the tensile and bending forces in the flexible elements. The resistive torque and the stresses in the flexible elements are therefore low, and this allows precise guidance over an amplitude of several degrees, and an extended life.

The stator preferably comprises a frame in the form of a regular polygon, the flexible elements being fixed to the corresponding vertices of the frame.

The rotor advantageously comprises a cylindrical ring, the flexible elements being fixed to an outer surface of said ring.

In one particular embodiment, the ring has a central hole, the rotor being capable of accepting a through shaft passing through said central hole.

The pivot advantageously comprises three uniformly distributed flexible elements.

The flexible elements are advantageously planar rectangular shaped webs arranged in a plane parallel to the axis of rotation. This enables an axial force to be withstood.

In one particular embodiment, the angle of inclination is between 2° and 1020 , preferably between 4° and 5°.

The invention also provides a shaft mounting comprising two pivots according to the above invention arranged at a distance from each other with their respective axes of rotation collinear.

This arrangement more effectively absorbs forces exerted on the mounted shaft and thus improves the mechanical strength and stiffness. Additionally, it is possible for the shaft to carry useful components on either side of the mounting.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 1 is a perspective view of a pivot in one embodiment of the invention,

FIG. 2 is a diagram of the arrangement of the webs of the pivot seen in FIG. 1,

FIG. 3 is a graph showing the relationship between applied torque and angle of rotation, for the pivot seen in FIG. 1, for different angles of inclination, FIG. 4 is a view similar to FIG. 2, FIG. 5 is a mounting comprising two pivots of the type seen in FIG. 1, FIG. 6 is a cross section through the mounting seen in FIG. 5, and FIGS. 7 and 8 are graphs showing the stresses in the webs of the pivots of FIG. 1, as a function of angle of rotation.

DETAILED DESCRIPTION OF THE DRAWINGS

The pivot 1 comprises a stator 2 comprising a frame in the shape of an isosceles triangle, and a rotor 3 capable of rotating relative to the stator 2 about an axis A. The rotor 3 is in the form of a cylindrical ring of revolution, with an axis A. The centres of the stator 2 and rotor 3 coincide with each other.

The stator 2 and the rotor 3 are connected by three webs 4. The webs 4 are shaped like rectangular planar plates. They are connected to the corresponding vertices of the stator 2 along one short side, and to an outer surface of the rotor 3 along the other short side.

The stator could be a different shape depending on the mechanism around it, and could for example have a different number of sides to suit the number of webs, which is not necessarily three. Moreover, the webs could be replaced by other flexible elements, such as tubes.

FIG. 2 shows the arrangement of the webs 4 more precisely. FIG. 2 shows the position of the webs 4 when the pivot 1 is in a condition of rest, that is when there is no torque tending to turn the rotor 3. The attachment circles 5 and 6 have diameters corresponding to the respective positions of the short sides of the webs 4. The straight lines D correspond to a radial direction passing through the axis A. It will be seen that the webs 4 form an angle, termed the angle of inclination α, relative to the radial direction.

The rotor 3 can rotate in the direction indicated by the arrow 15 in FIG. 4, which corresponds to the direction of the angle of inclination α. In FIG. 4, the dashes 4' represent the position of the webs 4 when the rotor 3 has rotated a few degrees. FIG. 3 shows the relationship between applied torque and the angle of rotation relative to the position seen in FIG. 2. The torque corresponds to the tensile and bending forces of the webs 4 due to the rotation of the rotor 3.

Curve 7 corresponds to the webs being straight, that is to say the angle of inclination α is zero, and enables a comparison to be made between the resistive torques in the different cases of inclination of the webs. It will be seen that the torque increases asymptotically with the angle of rotation because torque components due to tension and bending are added together. Curves 8 and 9 correspond to angles of inclination α of 4° and 5°, respectively. The torque remains low and stable in the range of angles of rotation of interest, because in this case from a certain angle of rotation the tensile component changes sign and is subtracted from the bending component.

It is therefore observed that the pivot 1 allows the rotor 3 to rotate within a range of several degrees about a reference position, with a limited and stable torque and therefore without exceeding the capacity of the motor. In the example shown, 1.5° has been chosen as the reference position, and the rotor 3 can rotate in both directions about this position. In FIG. 4 the dashes 4' represent the position of the webs 4 when the rotor 3 is in the reference position.

FIGS. 7 and 8 show the stresses present in the faces of the webs 4 as a function of the angle of rotation. Curves 15 and 18 correspond to straight webs, curves 16 and 19 to an angle of inclination α of 4°, and curves 17 and 20 to an angle of inclination α of 5°. Comparing curves 15 and 18 to the others shows that the use of a non-zero angle of inclination α limits the stresses and improves the mechanical strength and life of the pivot 1.

There exists an optimal angle of inclination α which minimizes the torque and/or stresses. This optimal angle may depend on the dimensions of the pivot 1 and on the material used. The optimal angle may for example be in the range 2° to 10°, preferably 4° to 5°.

FIGS. 5 and 6 show a rotary shaft 11 mounting 10 made with two pivots 1. The stators 2 of the pivots 1 are fixed to a structure 12, at a distance from each other and with their axes A collinear. The rotary shaft 11 is aligned with the axis A and fixed to the two rotors 3. In this mounting, the forces exerted on the shaft 11, represented by the arrows 13, are borne by the two pivots, as arrows 14 show, thus improving the mechanical strength of the mounting.

Although the invention has been described in relation to one particular embodiment, it will be obvious that it is in no way limited to it and that it encompasses all technical equivalents of the means described and their combinations where these fall within the scope of the invention.

The invention claimed is:

1. A through pivot, comprising:
   a stator and a rotor, the rotor being capable of turning relative to the stator about an axis of rotation and being capable of accepting a through shaft aligned with said axis of rotation, and
   a motor having a torque capacity and configured to rotate the rotor within a range of degrees about a reference position,
   wherein the rotor is connected to the stator by a plurality of flexible elements capable of being deformed to allow the rotor to rotate, and in that in a condition of rest the flexible elements form an angle of inclination relative to a radial direction passing through the axis of rotation of between 2° and 10° at the level of their attachment with the rotor, the angle of inclination relative to a radial direction being an angle that maintains a torque required for the rotation of the rotor lower than the torque capacity of the motor.

2. The pivot according to claim 1, in which the stator comprises a frame in the form of a regular polygon, the flexible elements being fixed to corresponding vertices of the regular polygon of the frame.

3. The pivot according to claim 2, comprising three uniformly distributed flexible elements.

4. The pivot according to claim 2, in which the flexible elements are planar rectangular shaped webs arranged in a plane parallel to the axis of rotation.

5. The pivot according to claim 1, in which the rotor comprises a cylindrical ring, the flexible elements being fixed to an outer surface of said ring.

6. The pivot according to claim 5, in which the ring has a central hole capable of accepting a through shaft passing through said central hole.

7. The pivot according to claim 6, in which the flexible elements are planar rectangular shaped webs arranged in a plane parallel to the axis of rotation.

8. The pivot according to claim 5, comprising three uniformly distributed flexible elements.

9. The pivot according to claim 5, in which the flexible elements are planar rectangular shaped webs arranged in a plane parallel to the axis of rotation.

10. The pivot according to claim 1, comprising three uniformly distributed flexible elements.

11. The pivot according to claim 10, in which the flexible elements are planar rectangular shaped webs arranged in a plane parallel to the axis of rotation.

12. The pivot according to claim 1, in which the flexible elements are planar rectangular shaped webs arranged in a plane parallel to the axis of rotation.

13. The pivot according to claim 1, in which the angle of inclination is between 4° and 5°.

14. The pivot according to claim 1, wherein the angle of inclination relative to the radial direction is an angle that stabilizes the torque required for rotation of the rotor in a predetermined range of rotation.

15. A mounting for a shaft, comprising two pivots according to claim 1 set a distance apart with the respective axes of rotation of the two pivots collinear.

16. The mounting according to claim 15, in which the stator comprises a frame in the form of a regular polygon, the flexible elements being fixed to corresponding vertices of the regular polygon of the frame.

17. The mounting according to claim 15, in which the rotor comprises a cylindrical ring, the flexible elements being fixed to an outer surface of said ring.

18. The mounting according to claim 17, in which the ring has a central hole capable of accepting a through shaft passing through said central hole.

19. The mounting according to claim 15, comprising three uniformly distributed flexible elements.

20. The mounting according to claim 15, in which the flexible elements are planar rectangular shaped webs arranged in a plane parallel to the axis of rotation.

* * * * *